(12) United States Patent
Jeong et al.

(10) Patent No.: US 10,862,383 B2
(45) Date of Patent: Dec. 8, 2020

(54) TRANSVERSE FLUX RECIPROCATING MOTOR AND RECIPROCATING COMPRESSOR HAVING A TRANSVERSE FLUX RECIPROCATING MOTOR

(71) Applicant: LG ELECTRONICS INC., Seoul (KR)

(72) Inventors: Sangsub Jeong, Seoul (KR); Jaebeum Kim, Seoul (KR); Jungsik Park, Seoul (KR); Susok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 15/624,785

(22) Filed: Jun. 16, 2017

(65) Prior Publication Data
US 2017/0373576 A1    Dec. 28, 2017

(30) Foreign Application Priority Data

Jun. 23, 2016  (KR) .................. 10-2016-0078836

(51) Int. Cl.
*H02K 33/00* (2006.01)
*F04B 35/04* (2006.01)
(Continued)

(52) U.S. Cl.
CPC ............. *H02K 33/00* (2013.01); *F04B 35/04* (2013.01); *F04B 35/045* (2013.01);
(Continued)

(58) Field of Classification Search
CPC ........ F04B 35/04; F04B 53/10; F04B 39/121; F04B 39/0005; F04B 35/045; H02K 1/34;
(Continued)

(56) References Cited

U.S. PATENT DOCUMENTS 2,298,388 A * 10/1942 Knobel .................. H02K 1/146
                                                310/216.022
2,954,917 A * 10/1960 Bayer ................... F04B 35/045
                                                417/417

(Continued)

FOREIGN PATENT DOCUMENTS

CN    102985692    3/2013
CN    204967590    1/2016
(Continued)

OTHER PUBLICATIONS

European Search Report dated Nov. 6, 2017 issued in Application No. 17176568.8.
(Continued)

*Primary Examiner* — Peter J Bertheaud
*Assistant Examiner* — Dnyanesh G Kasture
(74) *Attorney, Agent, or Firm* — Ked & Associates LLP

(57) ABSTRACT

A transverse flux reciprocating motor and a reciprocating compressor having a transverse flux reciprocating motor are provided. The transverse flux reciprocating motor may include a stator wound with a magnet coil, a mover inserted into the stator and coupled with a magnet having opposite magnetic poles in an orthogonal direction with respect to a magnetic flux generated by the magnet coil, and a magnetic resonance spring that allows the mover to perform a resonance motion with respect to the stator using a force trying to move toward a side with low magnetic resistance between the stator and the mover, whereby the transverse flux reciprocating motor and the reciprocating compressor having a transverse flux reciprocating motor may be reduced in size and weight and obtain high efficiency.

3 Claims, 17 Drawing Sheets

(51) Int. Cl.
    *H02K 33/16*     (2006.01)
    *F04B 39/00*     (2006.01)
    *F04B 39/12*     (2006.01)
    *F04B 53/10*     (2006.01)
    *H02K 1/14*     (2006.01)
    *H02K 1/34*     (2006.01)

(52) U.S. Cl.
    CPC ........ *F04B 39/0005* (2013.01); *F04B 39/121* (2013.01); *F04B 53/10* (2013.01); *H02K 1/146* (2013.01); *H02K 1/34* (2013.01); *H02K 33/16* (2013.01); *H02K 2201/12* (2013.01)

(58) Field of Classification Search
    CPC ............... H02K 33/16; H02K 2201/12; H02K 1/14–1/146; H02K 33/00–33/18; H02K 1/16–1/165; H02K 1/148; H02K 35/02
    See application file for complete search history.

(56) References Cited

U.S. PATENT DOCUMENTS

| | | | |
|---|---|---|---|
| 3,461,806 A | | 8/1969 | Barthalon |
| 4,707,910 A | * | 11/1987 | Saeed .................... H02K 1/141 |
| | | | 29/596 |
| 5,208,498 A | * | 5/1993 | Hamajima ............. H02K 33/16 |
| | | | 310/12.12 |
| 5,438,227 A | * | 8/1995 | Satomi ................... H02K 41/03 |
| | | | 310/12.17 |
| 5,528,090 A | * | 6/1996 | Satomi ................. H02K 41/031 |
| | | | 310/12.17 |
| 5,729,071 A | * | 3/1998 | Steiner .................... H02K 1/14 |
| | | | 310/172 |
| 9,000,626 B2 | * | 4/2015 | Aoyama ................ H02K 41/03 |
| | | | 310/12.15 |
| 2003/0155819 A1 | | 8/2003 | Kim et al. |
| 2009/0108699 A1 | * | 4/2009 | Li .......................... H02K 1/148 |
| | | | 310/216.009 |
| 2013/0154398 A1 | * | 6/2013 | Kim ..................... H02K 41/031 |
| | | | 310/12.24 |
| 2013/0181549 A1 | * | 7/2013 | Benner, Jr. ............. H02K 33/16 |
| | | | 310/38 |
| 2016/0156235 A1 | * | 6/2016 | Wang ....................... H02K 1/34 |
| | | | 417/416 |

FOREIGN PATENT DOCUMENTS

| | | |
|---|---|---|
| CN | 105298794 | 2/2016 |
| CN | 205017194 | 2/2016 |
| EP | 0 559 665 | 9/1993 |
| JP | 5-29920 | 1/1993 |
| JP | 09-131003 | 5/1997 |
| JP | 2002-295366 | 10/2002 |
| JP | 2009-247078 | 10/2009 |
| JP | 2010-158166 | 7/2010 |
| JP | 2010-239724 | 10/2010 |
| KR | 10-2004-0047320 | 6/2004 |
| KR | 10-2004-0096727 | 11/2004 |
| TW | 201136107 | 10/2011 |
| WO | WO 2011/049298 | 4/2011 |

OTHER PUBLICATIONS

Chinese Office Action dated Mar. 4, 2019.
European Search Report dated Apr. 8, 2019.
European Office Action dated Oct. 24, 2019.
Chinese Office Action dated Nov. 26, 2019.
Chinese Office Action dated Jul. 1, 2020 issued in Application No. 201710479722.3 (English translation attached).

* cited by examiner

TRANSVERSE FLUX RECIPROCATING MOTOR AND RECIPROCATING COMPRESSOR HAVING A TRANSVERSE FLUX RECIPROCATING MOTOR

CROSS-REFERENCE TO RELATED APPLICATION(S)

Pursuant to 35 U.S.C. § 119(a), this application claims the benefit of an earlier filing date of and the right of priority to Korean Application No. 10-2016-0078836, filed in Korea on Jun. 23, 2016, the contents of which are incorporated by reference herein in its entirety.

BACKGROUND

1. Field

A reciprocating motor and a reciprocating compressor having a transverse flux reciprocating motor are disclosed herein.

2. Background

A motor is a device that converts electrical energy into mechanical energy to obtain a rotational force or a reciprocating force. Such motors may be divided into an alternating current (AC) motor and a direct current (DC) motor depending on a type of power applied.

The motor includes a stator and a mover (or a rotor). The mover which is provided with a magnet performs a rotating motion or a reciprocating motion along a direction of flux which is generated while currents flow along a coil provided in the stator.

Such a motor may be classified into a rotary motor or a reciprocating motor depending on a motion type of the mover. For the rotary motor, a magnetic flux is generated in a stator by power applied to a magnet coil, and the mover rotates with respect to the stator due to the magnetic flux. On the other hand, for the reciprocating motor, the mover linearly reciprocates with respect to the stator.

The reciprocating motor is a kind of motor in which a magnetic flux typically having a stereoscopic structure is transformed into a planar shape, namely, the mover having a planar shape is placed on an upper side of a stator also having a planar shape, so as to be linearly movable in response to changes in a magnetic field of the stator. In recent years, a reciprocating motor for a compressor is introduced has been which a stator is formed in a cylindrical shape having an inner stator and an outer stator, a magnet coil that generates an inductive magnetic field is wound on one of the inner stator or the outer stator, a mover with a magnet with magnetic poles arranged in an axial direction of the stator reciprocates in an air gap between the inner stator and the outer stator.

A reciprocating motor for a compressor is disclosed in Korean Registration Patent No. 10-0492615 (hereinafter, referred to as "Prior Art 1") and Korean Registration Patent No. 10-0539813 (hereinafter, referred to as "Prior Art 2"), which are hereby incorporated by reference.

Prior Art 1 and Prior Art 2 disclose a structure in which a plurality of iron cores made of thin plates in a blanking manner are radially stacked into a cylindrical shape. Prior Art 1 discloses a structure in which each of the inner stator and the outer stator has a radially stacked structure, while Prior Art 2 is an improved structure of that of Prior Art 1, namely, has a structure in which core blocks with an inner stator in a radially-stacked form and an outer stator in an arcuately-stacked form are radially stacked.

However, in the prior art reciprocating motor as described above, the inner stator and the outer stator are fabricated by individually blanking hundreds of iron cores and radially stacking the individual iron cores. However, it is difficult to blank and radially stack such hundreds of iron cores and also difficult to fix the stacked iron cores into a cylindrical shape. This causes considerable difficulty in fabricating the inner stator and the outer stator.

That is, fabrication of the hundreds of iron cores using the blanking manner causes a high fabricating cost. Further, an assembly process becomes complicated due to radially stacking the individual sheets of iron cores and an assembly time is excessively long, which results in an increase in the fabricating cost. Also, even when the individual sheets of iron cores are bundled into several core blocks by each predetermined number and the core blocks are radially stacked, the hundreds of iron core sheets should be fabricated in the blanking manner and the individual iron core sheets should be stacked radially. Accordingly, drawbacks of the assembly process of assembling the stator and the required fabricating cost are still unsolved.

Further, in the prior art reciprocating motor, in order to fix the inner stator and the outer stator to remain in the cylindrical shape, separate fixing rings are press-fitted. However, it is difficult to align positions of fixing grooves provided on each iron core and to press-fit the fixing rings into the fixing grooves provided on the hundreds of iron core sheets when stacking the individual iron core sheets. In addition, when the plurality of iron cores are bundled into the core blocks, the core blocks usually remain in shape typically due to a caulking operation. However, when the iron core has a narrow area, some of the iron cores are distorted in shape during the caulking operation. This makes it impossible to form the iron cores in a small size and thereby causes a limitation in a size reduction of the motor.

In addition, the prior art reciprocating motor, as the mover is supported by mechanical resonance springs as compression coil springs, cannot use an operating frequency of a specific section within a predetermined operating frequency section due to self resonance caused by a nature of the compression coil spring. In the prior art reciprocating motor, due to the installation of the mechanical resonance springs configured as the compression coil springs, limitations in mechanical stress and vibration distance are caused. Accordingly, the resonance springs should ensure predetermined diameters and lengths. This results in reducing a length of the reciprocating motor in a horizontal direction.

In addition, as the prior art reciprocating motor is provided with the mechanical resonance springs configured as the compression coil springs, spring support members that fix both ends of each compression coil spring should be provided on each of the mover and the stator. This makes a mechanical structure of the motor complicated. In addition, as the plurality of resonance springs should be installed at both of front and rear sides of the mover by pressing them with high pressure, the assembly process becomes difficult.

In addition, as the prior art reciprocating motor is provided with the mechanical resonance springs configured as the compression coil springs, the mover becomes eccentric due to aside force generated due to characteristics of the compression coil spring, which causes an increase in friction loss with the stator. In the prior art reciprocating motor, as the mover including the magnet is arranged between the outer stator and the inner stator to reciprocate, air gaps are formed at an outside and an inside of the mover. This increases an overall air gap, thereby lowering motor efficiency.

Further, in the prior art reciprocating motor, a magnet frame that supports the magnet is thick, which increases an overall weight of the mover, thereby increasing power consumption. Further, an air gap between the outer stator and the inner state more increases, thereby further deteriorating motor efficiency. Furthermore, a reciprocating compressor using the reciprocating motor as described above still has the problems of the prior art reciprocating motor, and thus has a limitation in a size reduction.

BRIEF DESCRIPTION OF THE DRAWINGS

Embodiments will be described in detail with reference to the following drawings in which like reference numerals refer to like elements, and wherein.

DETAILED DESCRIPTION

Figure 1:
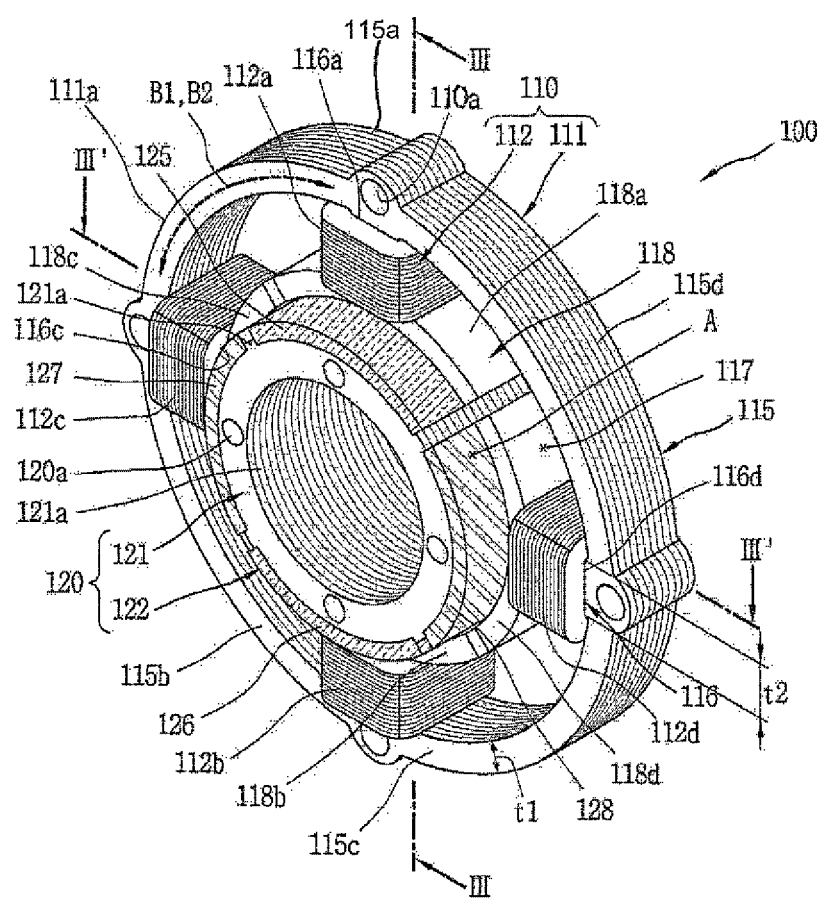
FIG. 1 is a perspective view of a transverse flux reciprocating motor in accordance with an embodiment.

Description will now be given in detail of a transverse flux reciprocating motor according to embodiments disclosed herein, with reference to the accompanying drawings. Where possible, like reference numerals have been used to indicate like elements and repetitive disclosure has been omitted.

Figure 2:
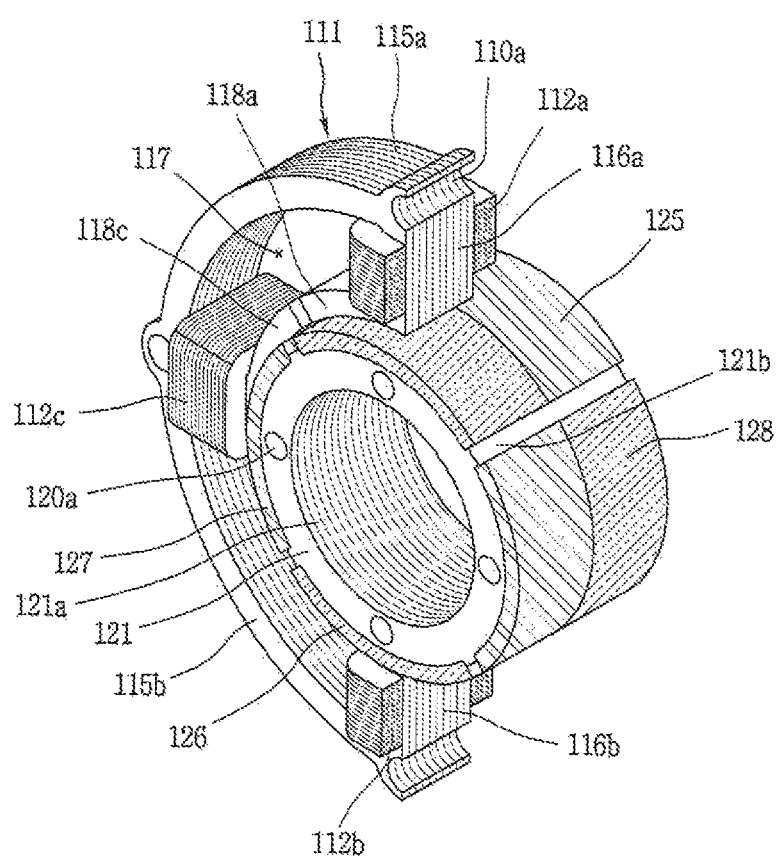
FIG. 2 is a perspective view of a portion of the transverse flux reciprocating motor according to FIG. 1 in a cutoff state.
Figure 3A:
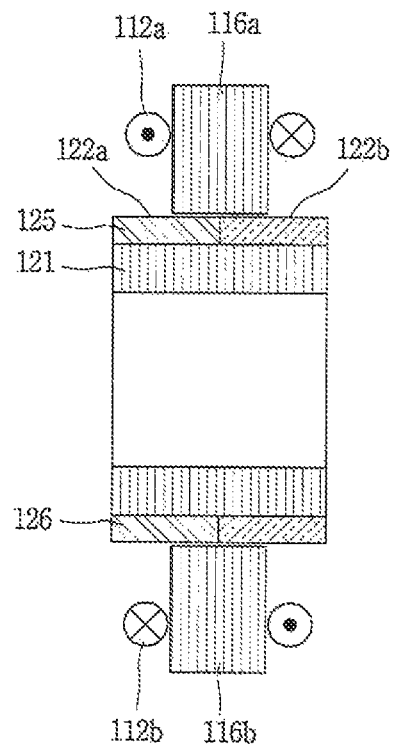
FIGS. 3A and 3B are cross-sectional views, taken along lines III-III and III'-III' in FIG. 1.
Figure 3B:
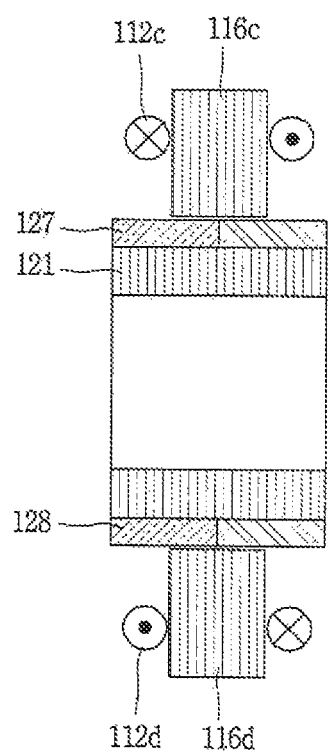
Figure 4:
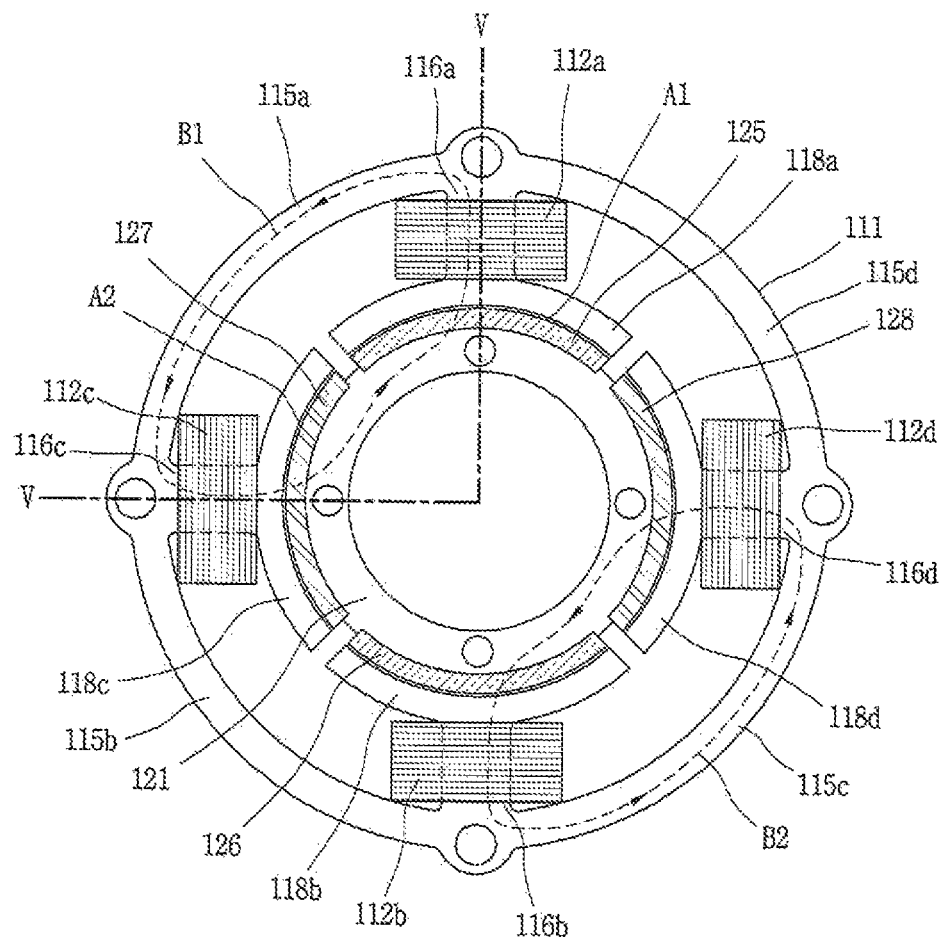
FIG. 4 is a front view illustrating the transverse flux reciprocating motor according to FIG. 1.
Figure 5A:
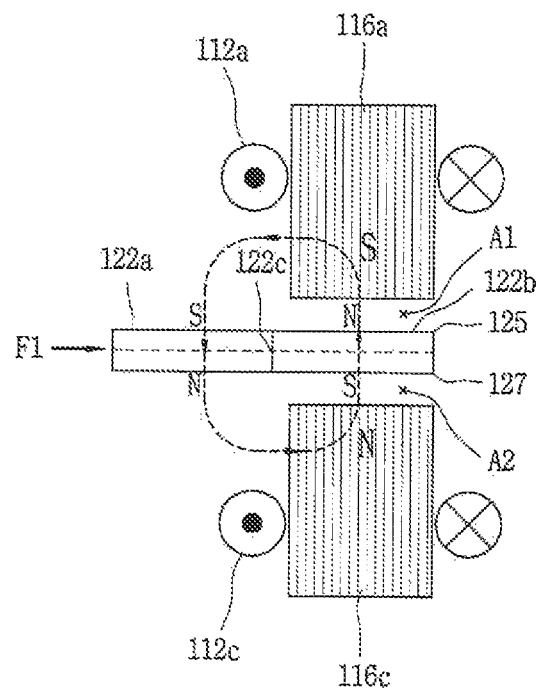
FIGS. 5A to 5C are schematic views illustrating operations of the reciprocating motor according to an embodiment, taken along line V-V of FIG. 4.
Figure 5B:
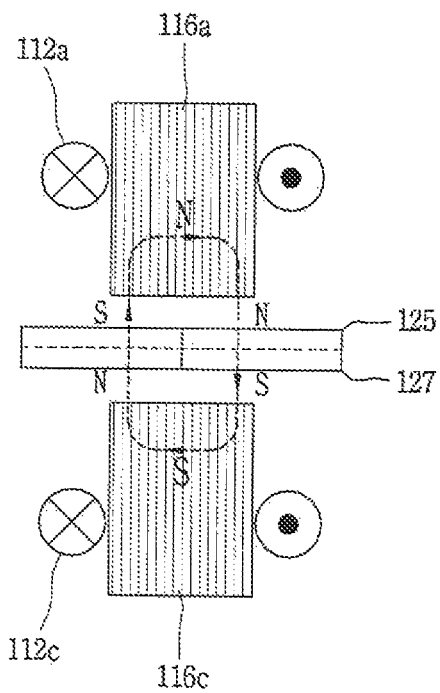
Figure 5C:
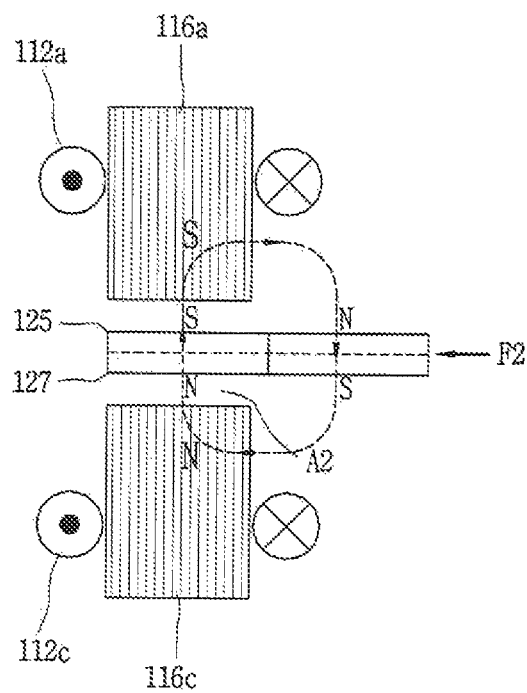

FIG. 1 is a perspective view of a transverse flux reciprocating motor in accordance with an embodiment. FIG. 2 is a perspective view of a portion of the transverse flux reciprocating motor according to FIG. 1. FIGS. 3A and 3B are cross-sectional views, taken along lines III-III and III'-III' in FIG. 1. FIG. 4 is a front view illustrating the transverse flux reciprocating motor according to FIG. 1. FIGS. 5A to 5C are schematic views illustrating operations of the reciprocating motor according to an embodiment, taken along line V-V of FIG. 4.

As illustrated in FIG. 1, a transverse flux reciprocating motor (hereinafter, referred to as a "reciprocating motor") 100 according to an embodiment may be configured such that a mover 120 may be inserted into a stator 110 with a predetermined air gap A from the stator 110. The stator 110 may be formed by winding magnet coils 112 on a stator core 111.

The stator core 111 may be formed by stacking a plurality of stator side iron cores 111a each formed in a predetermined shape by a predetermined length in an axial direction. That is, as the stator core 111 is formed by stacking the stator side iron cores 111a which are individual sheets, the stator core 111 and each sheet of stator side iron cores 111a have a same planar shape. Therefore, the shape of the stator will be described hereinafter taking the stator core as an example.

The stator core 111 may also be provided with a yoke portion or yoke 115 which is formed in an annular shape and forms a magnetic path, and tooth portions or teeth 116 (116a-116d) which extend from an inner circumferential surface of the yoke portion 115 in a radial direction and are wound with the magnet coils 112. Slot portions or slots 117 may be formed to define empty spaces between the adjacent tooth portions 116 such that the magnet coils 112 may be wound on the tooth portions 116. Accordingly, the tooth portions 116 and the slot portions 117 may be alternately formed along a circumferential direction.

Bolt holes 110a for coupling the yoke portion 115 with bolts may be formed at suitable positions or points along the circumferential direction. The bolt holes 110a may be formed anywhere on the yoke portion 115. The bolt holes 110a may be formed within a circumferential range in which the tooth portions 116 are formed, taking into account coupling strength, such that only portions where the bolt holes 110a are formed are partially expanded without increasing an overall width of the yoke portion 115.

Figure 6:
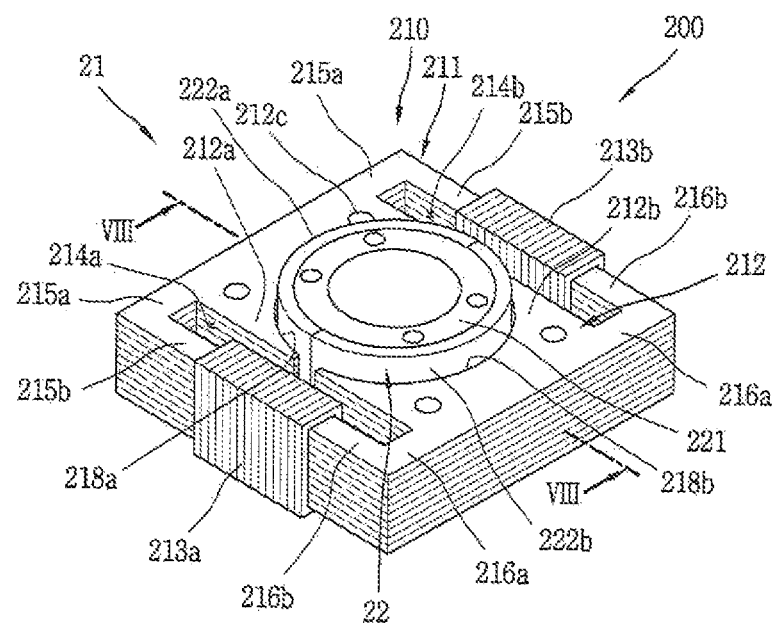
FIG. 6 is a perspective view of a reciprocating motor in accordance with another embodiment.
Figure 9:
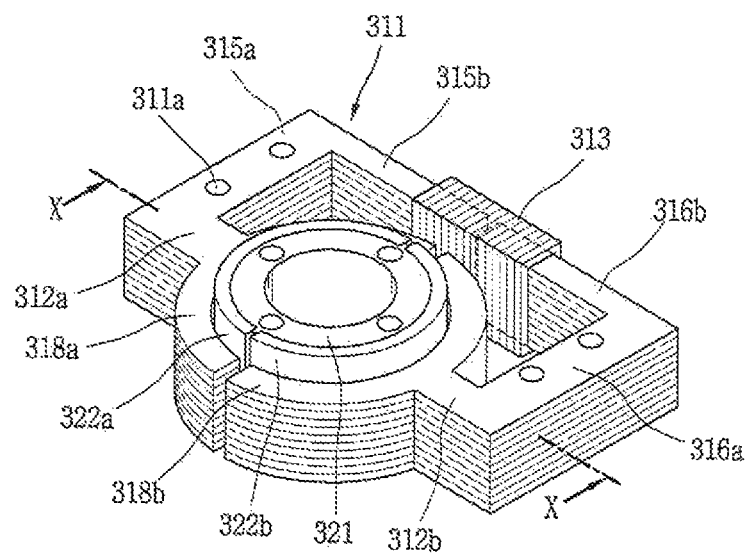
FIG. 9 is a perspective view of a reciprocating motor in accordance with another embodiment.

The yoke portion 115, as illustrated in FIGS. 1 and 2, may be integrally formed, but may alternatively be punched out into a plurality of portions, like a split core, to be assembled later. The split core method may be configured as illustrated in FIGS. 6 and 9 and described hereinafter, but a method of separating the yoke portion 115 from the tooth portions 116 and assembling the yoke portion 115 and the tooth portions 116 later may also be sufficiently considered even in the structure illustrated in FIG. 1.

The tooth portions 116 may extend from the inner circumferential surface of the yoke portion 115 in an integral form, but may alternatively be separately fabricated, like the split core, and assembled to the yoke portion 115 later. When the tooth portions 116 are fabricated separately from the yoke portion 115 and then assembled to the yoke portion 115 later, the plurality of magnet coils 112 may be fabricated in an annular shape and then inserted onto the tooth portions 116, other than forming the stator core 111 in the stacking manner and then winding the magnet coils 112 using a winding device (not illustrated). However, in this instance, when the reciprocating motor is small in size, the tooth portions may be integrally formed with the yoke portion and the magnet coils later wound by the winding device.

A width t2 of each tooth portion 116 may be larger than a width t1 of the yoke portion 115. As a result, an area of the magnetic path at the tooth portion may be secured so as to improve a performance of the motor, and also a deformation of the yoke portion 115 or the tooth portion 116 due to a torsional moment when the bolt is fastened to the bolt hole 110a may be prevented.

In addition, a stator pole portion or pole 118 may extend from an inner end portion or end of each tooth portion 116 to both sides in a circumferential direction. A circumferential length of the stator pole portion 118 may be the same as a circumferential length of each magnet 122, which is described hereinafter. However, when the circumferential length of the stator pole portion 118 is larger than the circumferential length of the magnet 122, the stator pole portion may affect neighboring magnets. Thus, the circumferential length of the stator pole portion 118 should not be larger than the circumferential length of the magnet, if possible.

In addition, when at least two of the magnet coil 112 are provided in an even number and the magnet coil 112 is wound on the tooth portion 116, the magnet coil 112 may also provided by at least two in the even number. The magnet coils 112 may be wound along the circumferential direction in an alternating manner. In this way, a magnetic flux direction of one tooth portion 116 may also be opposite to a magnetic flux direction of another neighboring tooth portion along the circumferential direction.

For example, as illustrated in FIG. 1, when there are four magnet coils 112, as illustrated in FIGS. 3A and 3B, a first magnet coil 112a located on an upper side in FIG. 1 may be wound in an opposite direction to a third magnet coil 112c located on a first or left side, and a fourth magnet coil 112d located on a second or right side in FIG. 1, but is wound in the same direction as the second magnet coil 112b located on a lower side in FIG. 1.

However, when there are more than four magnet coils 112, one magnetic coil 112 may be wound in a same direction as another magnet coil neighboring thereto along the circumferential direction, and thus, the magnetic flux direction of one tooth portion may also be formed in the same direction as at least one neighboring tooth portion. The magnet coils may be wound or the magnetic poles of the magnets may be arranged such that a pair of magnet coils 112 and a pair of magnets 122 form magnetic flux in the same direction.

On the other hand, the mover 120 may be formed by coupling magnets 122 to a mover core 121. The mover core 121, similar to the stator core 111, may be formed by stacking a plurality of mover side iron cores 121a each formed in a predetermined shape by a predetermined length in an axial direction. An outer diameter of the mover core 121 may be smaller than an inner diameter of the stator core 111 such that the air gap A may be formed between an outer circumferential surface of the mover core 121 and an inner circumferential surface of the stator core 111.

The mover core 121 may be formed in an annular shape. However, an inner circumferential surface of the mover core 121 may be formed in a circular shape, but may be formed to correspond to a shape of an outer circumferential surface of another member (for example, a frame or a cylinder when applied to a compressor).

Fixing protrusions 121b may be formed on an outer circumferential surface of the mover core 121 such that the magnets 122 may be spaced apart from one another by a predetermined distance in the circumferential direction. The fixing protrusions 121b may form an elongated protrusion in an axial direction when the plurality of mover side iron cores 121a are stacked in the axial direction. However, the mover core may be formed with the magnets 122 attached to its outer circumferential surface, as illustrated in this embodiment, while the mover core may also be coupled to one end of each magnet in an injection manner. In this case, even the size of the air gap as well as a weight of the mover 120 may be reduced, thereby enhancing motor efficiency.

The mover core 121 may be provided with bolt holes 120a formed at appropriate positions or points thereof along the circumferential direction. The bolt hole 120a may be flush with the bolt hole 110a of the stator core 111 in the radial direction.

The magnets 122 may be attached to the outer circumferential surface of the mover core 121 or fixed thereto using separate fixing members. The mover core 121 may be divided, and a part or portion of the mover cover 121 may form another stator core, located at an inner side, together with the stator core 111. When the mover core 121 forms an inner stator, the magnets 122 and the mover core 121 may be separated from each other such that other air gaps may be formed between inner circumferential surfaces of the magnets 122 and the mover core 121.

Each of the magnets 122, as illustrated in FIGS. 2 to 3B, may be formed to have different magnetic poles along an axial direction. For example, the magnet 122 may be configured as a 2-pole magnet such that a first portion 122a has an N pole and a second portion 122b has an S pole in the axial direction.

The magnets 122 may be configured such that one magnet 122 has opposite poles to poles of the neighboring magnets along the circumferential direction to correspond to winding directions of the magnet coils 112. That is, a first magnet 125 corresponding to a first magnet coil 112a has magnetic poles, which are opposite to poles of each of a third magnet 127 and a fourth magnet 128 located on lateral or left and right sides of the first magnet 125, and may be the same as magnetic poles of a second magnet 126 corresponding to the second magnet coil 112b. Of course, when at least four of the magnets 122 are provided, similar to the magnet coils 112, the magnets 122 may also be configured such that one magnet has the same poles as neighboring magnets.

On the other hand, the magnet 122 may be configured as a relatively inexpensive ferrite magnet, but may be configured as an Nd magnet having high magnetic flux density and coercive force when a mechanical resonance spring is excluded and a magnetic resonance spring of a reciprocating motor is applied.

That is, by using a centering force in a reciprocating direction, which is generated between the magnet coil 112 and the magnet 122 while the mover 120 moves relative to the stator 110, the mover 120 may mechanically perform a reciprocating resonance motion even without a separate mechanical resonance spring. The magnet 122 should have high magnetic flux density and coercive force, and thus, the Nd magnet may be employed rather than the ferrite magnet. Accordingly, in the reciprocating motor according to this embodiment, by virtue of the exclusion of the mechanical resonance spring, a number of components may be reduced so as to simplify an assembly process and also an installation space of the mechanical resonance springs may be reduced so as to remarkably decrease a size of the motor. Also, the mover may be likely to be eccentric due to a side force generated due to characteristics of a compression coil spring which is applied as the mechanical resonance spring, but the problem may also be solved.

Unexplained reference numerals 115*a* to 115*d* denote first to fourth yoke portions or yokes.

Hereinafter, an operation of the reciprocating motor according to this embodiment will be described.

That is, when an alternating current is applied to each of the magnet coils 112 of the reciprocating motor 100, as illustrated in FIG. 4, a pair of magnetic paths is formed along the tooth portions 116*a* to 116*d* and the yoke portions 115*a* to 115*d* located between the neighboring tooth portions by the first and third magnet coils 112*a* and 112*c* neighboring to each other and the second and fourth magnet coils 112*b* and 112*d* neighboring to each other. Accordingly, the magnetic fluxes generated by the respective magnet coils become alternating magnetic fluxes B1 and B2. Then, magnetic force by a kind of alternating magnetic pole is generated on each stator pole portion 118*a* to 118*d* (or air gaps) of the stator core 111 by the alternating magnetic flux B1, B2.

The magnets 122 attached to the mover core 121 are affected by attractive force or repulsive force due to the magnetic force corresponding to the pole of each stator pole portion 118*a* to 118*d*, so as to perform a reciprocating motion in a direction orthogonal to a direction of the magnetic flux. In this manner, a kind of transverse flux reciprocating motor may be implemented.

For example, as illustrated in FIG. 5A, the first magnet coil 112*a* wound on the tooth portion 116*a* (hereinafter, referred to as a "first tooth portion" or "first tooth") located on an upper side and the second magnet coil 112*b* wound on the tooth portion 116*b* (hereinafter, referred to as a "second tooth portion" or "second tooth") located on a lower side opposite to the first tooth portion 116*a* have opposite current flowing directions to each other. Also, the third magnet coil 112*c* wound on the tooth portion 116*c* (hereinafter, referred to as a "third tooth portion" or "third tooth") located on a first or left side of the first tooth portion 116*a* and the fourth magnet coil 112*d* wound on the tooth portion 116*d* (hereinafter, referred to as a "fourth tooth portion" or "fourth tooth") located on a second or right side opposite to the third tooth portion 116*c* have opposite current flowing directions to each other.

Although the magnetic fluxes on the first tooth portion 116*a* and the second tooth portion 116*b* are opposite to each other, the stator pole portions (or air gaps) 118*a* and 118*b* of the tooth portions 116*a* and 116*b* have the same pole. For example, when the stator pole portion 118*a* of the first tooth portion 116*a* has the S pole, the stator pole portion 118*b* of the second tooth portion 116*b* also has the S pole.

As the first magnet 125 located in an air gap A1 spaced from the first tooth portion 116*a* and the second magnet 126 located in an air gap A2 spaced from the second tooth portion 116*b* have the same magnetic pole (122*a*, 122*b*) in an axial direction orthogonal to the direction of the magnetic flux formed by each magnet coil 112*a* (122), the N pole of each of the first magnet 125 and the second magnet 126 is affected by an attractive force in a direction approaching the stator pole portion 118*a* of the first tooth portion 116*a* and the stator pole portion 118*b* of the second tooth portion 116*b*, while the S pole of each of the first magnet 125 and the second magnet 126 is affected by a repulsive force in a direction directed away from the stator pole portion 118*a* of the first tooth portion 116*a* and the stator pole portion 118*b* of the second tooth portion 116*b*.

At the same time, the third tooth portion 116*c* and the fourth tooth portion 116*d* generate the magnetic fluxes in an opposite direction to the first tooth portion 116*a* and the second tooth portion 116*b*. Accordingly, the stator pole portions 118*c* and 118*d* (or air gaps) of the third tooth portion 116*c* and the fourth tooth portion 116*d* have the N pole.

As the third magnet 127 corresponding to the stator pole portion 118*c* of the third tooth portion 116*c* and the fourth magnet 128 corresponding to the stator pole portion 118*d* of the fourth tooth portion 116*d* are arranged to have the same magnetic pole (122*b*, 122*a*) in the axial direction, the S pole of each of the third magnet 127 and the fourth magnet 128 is affected by an attractive force in a direction approaching the stator pole portion 118*c* of the third tooth portion 116*c* and the stator pole portion 118*d* of the fourth tooth portion 116*d*, while the N pole is affected by a repulsive force in a direction directed away from the same.

Accordingly, the mover 120 is moved to left, as illustrated in FIG. 5A, by the third and fourth magnet coils 112*c* and 112*d* and the third and fourth magnets 127 and 128 as well as the first and second magnet coils 112*a* and 112*b* and the first and second magnets 125 and 126. On the other hand, as illustrated in FIG. 5B, when currents are applied to the first and second magnet coils 112*a* and 112*b* and the third and fourth magnet coils 112*c* and 112*d* in a direction opposite to that of FIG. 5A, the stator pole portions 118*a* to 118*d* of the first and second tooth portions 116*a* and 116*b* and the third and fourth tooth portions 116*c* and 116*d* have magnetic poles opposite to those of FIG. 5A. Accordingly, each magnet 125 to 128 is subjected to an attractive force and a repulsive force in opposite directions to those of FIG. 5A, and thus, the mover 120 may be moved to the right in the drawing so as to be restored to its original position.

When a mechanical resonance spring (not illustrated), such as a compression coil spring, is provided on a left side of the mover 120, the resonance spring accumulates elastic force. When the mover 120 receives magnetic force in an opposite direction, the mover 120 is resonated and moved to the right in the drawing by the resonance spring.

However, when the compression coil spring is applied as the mechanical resonance spring, a partial section of an operating frequency band cannot be used as the operating frequency due to characteristics of the compression coil spring and also a space for installing the compression coil spring is required. This increases a length of the reciprocating motor in a reciprocating direction, and increases a number of components accordingly, thereby causing a limitation in a size reduction of the motor. Therefore, in this embodiment, instead of employing the mechanical resonance spring, the magnetic force of the reciprocating motor may increase and simultaneously the magnets may be controlled not to deviate from a magnetic attractive force range, so that the mover may be resonated by a centering force in the reciprocating direction between the stator core and the magnets.

That is, in the reciprocating motor 100 according to this embodiment, when the mover 120 (or magnet) is moved away from the stator pole portion 118 by magnetic force, the mover 120 is subject to the centering force in the reciprocating direction to be restored toward the stator pole portion 118, namely, toward a stator pole portion (i.e., air gap) 118 with low magnetic energy (magnetic resistance). This force is referred to as a magnetic resonance spring, and the mover 120 may perform a resonance motion by the magnetic resonance spring. Accordingly, the mover of the reciprocating motor may perform the resonance motion even without employing the mechanical resonance spring. This may allow an entire section of the operating frequency band to be used as the operating frequency, allow the motor to be small in size and light in weight, and reduce a number of components so as to lower fabricating costs, as compared to employing the mechanical resonance spring.

For example, as illustrated in FIG. 5A, when the mover core 121 is moved together with the magnet 122 to the left side of the drawing by the magnetic force, a centering force F1 in the reciprocating direction to be restored toward an air gap with low magnetic energy (i.e., magnetic position energy or magnetic resistance), namely, toward the right side of the drawing is accumulated between the magnet 122 and the stator core 111. When a direction of a current applied to the magnet coil 112 is changed, the mover core 121 and the magnet 122 are moved to the right side of the drawing by virtue of the magnetic force applied toward the gap A, generated by the magnet coil 112, and the accumulated centering force in the reciprocating direction. Accordingly, a boundary surface 122c between magnetic poles, as illustrated in FIG. 5B, is returned to a center of the stator pole portion 118.

Then, the mover 120 is moved further to the right side of the drawing via the stator pole portion 118 by inertial force and the magnetic force. In this instance, as illustrated in FIG. 5C, when a current is applied to the magnet coil 112 in a direction opposite to that of FIG. 5B, the magnetic pole as illustrated in FIG. 5A is formed on each stator pole portion 118 of the tooth portion 116, and thereby an attractive force and a repulsive force are generated on each magnet 122 in the directions as illustrated in FIG. 5A. Consequently, the mover 120 is moved to the left side of the drawing, as illustrated in FIG. 5C.

As the centering force F2 in the reciprocating direction, as illustrated in FIG. 5C, is accumulated between the magnet 122 and the stator core 111, the mover 120 is moved to the left side of the drawing, similar to the case of employing the mechanical resonance spring, by the accumulated centering force and the magnetic force applied toward the air gap, so as to be returned to the stator pole portion 118. This series of reciprocating motions is repeated.

Meanwhile, the foregoing embodiment has illustrated that the stator is located at the outer side and the mover is located at the inner side, but in certain cases, the stator may be arranged at the inner side and the mover may be arranged at the outer side. Even in this case, shapes and arrangements of the stator core, the magnet coil, the mover core, and the magnets are the same as those in the foregoing embodiment, so detailed description thereof has been omitted.

However, when the mover is provided outside of the stator as illustrated in this embodiment, the tooth portions are formed on the outer circumferential surface of the yoke portion, and the magnets are attached to the inner circumferential surface of the mover core. As the magnet is disposed outside of the magnet coil and thus the size of the magnet is increased, an inexpensive ferrite magnet may be applied as the magnet even though having relatively low magnetic flux density and coercive force.

Hereinafter, another embodiment of a reciprocating motor according will be described. That is, in the foregoing embodiment, the magnet coil is wound on the tooth portion, but in this embodiment, a magnet coil is wound on a yoke portion.

Figure 7:
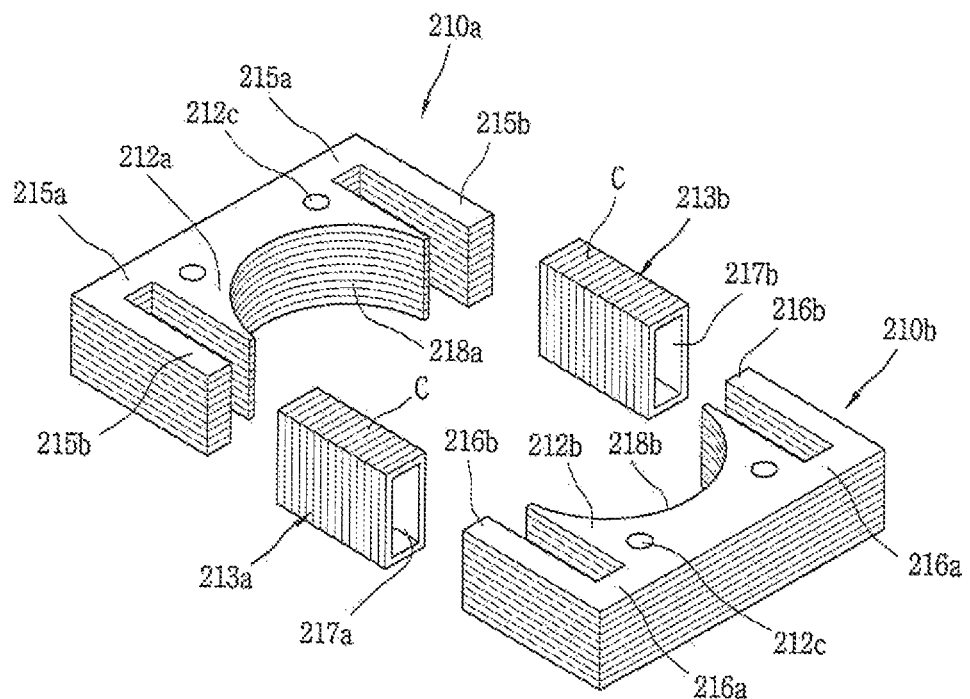
FIG. 7 is an exploded perspective view of the reciprocating motor according to FIG. 6.
Figure 8:
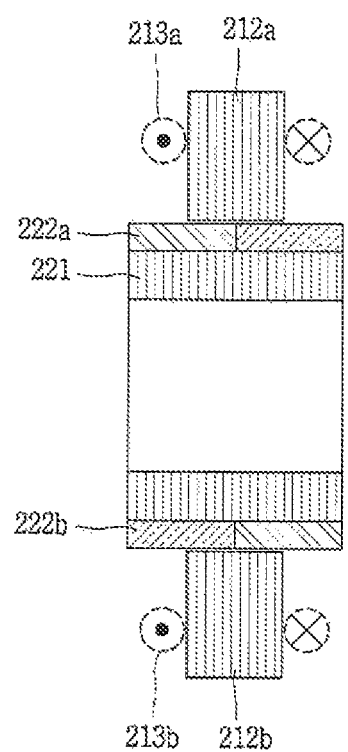
FIG. 8 is a sectional view, taken along line VIII-VIII of FIG. 6.

FIG. 6 is a perspective view of a reciprocating motor according to another embodiment. FIG. 7 is an exploded perspective view of the reciprocating motor according to FIG. 6. FIG. 8 is a cross-sectional view, taken along line VII-VII of FIG. 6.

As illustrated in FIG. 6, a stator 21 of a reciprocating motor 200 according to this embodiment may include a yoke portion or yoke 211 formed in a rectangular ring shape and forming a stator core 210, and a tooth portion 212 that radially protrudes from two inner circumferential surfaces, respectively, which face each other of (four) inner circumferential surfaces of the yoke portion 211.

The yoke portion 211 may include horizontal yoke portions or yokes 215a and 216a that extend from both side surfaces of each tooth portion 212, and longitudinal yoke portions 215b and 216b that perpendicularly extend from end portions or ends of the respective horizontal yoke portions 215a and 216a. That is, the first horizontal yoke portions 215a may extend from both lateral or right and left side surfaces of a first tooth portion or tooth 212a in a widthwise direction of the tooth portion 212a, and the first longitudinal yoke portions 215b may be bent from respective end portions or ends of the first horizontal yoke portions 215a and extend toward the second longitudinal yoke portions 216b, which are described hereinafter.

The second horizontal yoke portions 216a may extend from both lateral or right and left side surfaces of a second tooth portion or tooth 212b in a widthwise direction of the second tooth portion 212b and the second longitudinal yoke portions 216b may be bent from respective end portions or ends of the second longitudinal yoke portions 216a to extend toward the first longitudinal yoke portions 215b. Accordingly, the first longitudinal yoke portions 215b may be coupled to the corresponding second longitudinal yoke portions 216b, respectively, so as to define a longitudinal length of the entire stator core. Magnet coils 213a and 213b may be wound on the first longitudinal yoke portions 215b and the second longitudinal yoke portions 216b, respectively.

The first longitudinal yoke portion 215b and the second longitudinal yoke portion 216b may be integrally formed with each other, but may alternatively formed separate from each other so as to be coupled to both ends of each magnet coil 213a and 213b. For example, when the yoke portion 211 is formed in an integral shape, the magnet coils 213a and 213b may be wound on the yoke portion 211 by using a winding device after stacking the stator core 210. However, in this instance, when the motor is small in size, an area of each slot portion or slot 214a and 214b may be narrow, which may make it difficult to perform the winding task.

Therefore, as illustrated in FIG. 7, the stator core 210 may be divided into a first core 210a and a second core 210b, each of which may be formed in a symmetrical shape in lateral or left and right directions with the tooth portions 212a and 212b disposed at a middle of the yoke portion 211. Yoke end portions or yokes of the first core 210a and yoke end portions or yokes of the second core 210b may be coupled to each other in an aligning manner. In this instance, the yoke end portions of the first core 210a may form the first longitudinal yoke portions 215b, respectively, and the yoke end portions of the second core 210b may form the second longitudinal yoke portions 216b, respectively. Accordingly, the first longitudinal yoke portions 215b and the second longitudinal yoke portions 216b may be inserted into both side openings of the magnet coils 213a and 213b, respectively, so that a magnetic flux forms a closed loop.

The magnet coils 213a and 213b may be formed by winding coils on rectangular bobbins 217a and 217b, respectively, and the yoke end portions of the first core 210a and the yoke end portions of the second core 210b may be inserted into both side openings of the respective rectangular bobbins 217a and 217b such that both of the cores may be assembled to each other, or the magnet coils 213a and 213b may be formed in a rectangular shape with both sides open, without bobbins, and then the yoke end portions of the first core 210a and the yoke end portions of the second core 210b may be inserted into the both side openings of the respective magnet coils 213a and 213b such that both of the cores may be assembled to each other.

The slot portions 214a and 214b for winding the magnet coils 213a and 213b may be formed at both sides of the tooth portion 212, that is, at another two inner circumferential surfaces of the yoke portion 211 which face each other. Stator pole portions or poles 218a and 218b which surround a mover 22 with predetermined air gaps may be formed on inner circumferential surfaces of the tooth portion 212. The stator pole portions 218a and 218b may be formed in a semi-circular shape to surround the mover 22 because there are the two tooth portions 212a and 212b (212).

The tooth portion 212 may be curved such that an inner wall surface of the yoke portion 211 forming the slot portions 214a and 214b corresponds to an inner circumferential surface of the stator pole portions 218a and 218b. In this case, however, as a width of the tooth portion 212 is narrowed to reduce an area of a magnetic path and increase magnetic path resistance, the width of the tooth portion 212 may be approximately equal to an outer diameter of the stator pole portion 218a, 218b. Accordingly, the tooth portion 212 may be formed from both ends of each stator pole portion 218a and 218b toward the inner circumferential surfaces of both sides of the yoke portion 211 in a perpendicular direction.

As a result, an inner wall surface of the slot portion may be formed linear like an outer wall surface of the slot portion. This may result in increasing the width of the tooth portion and thus ensuring a sufficient magnetic path area of the tooth portion.

The basic configuration of the reciprocating motor according to this embodiment and the thusly-obtained operation effects are similar to those of the foregoing embodiment, and thus detailed description thereof has been omitted.

However, in this embodiment, as illustrated in FIG. 8, as the magnet coils 213a and 213b may be wound on both sides of the yoke portion 211, the magnet coils 213a and 213b may be wound in opposite directions to each other. A plurality of magnets 222a and 222b attached to a surface of the mover core 221 may have opposite magnetic poles to each other in an axial direction to correspond to both of the tooth portions 212a and 212b.

Accordingly, when currents are applied to both of the magnet coils 213a and 213b, magnetic fluxes flow in opposite directions on both sides of the yoke portion 211, but are combined together on the tooth portion 212 to flow in the same direction, such that the tooth portions 21a and 21b (212) have different magnetic poles. Then, each of the magnets 222a and 222b may reciprocate in the axial direction of the mover 22 by receiving an attractive force and a repulsive force.

Thus, the reciprocating motor according to this embodiment may reduce a size of the stator and secure a magnetic path area of the tooth portion, thereby further reducing the size of the motor. In addition, the number of tooth portions and magnet coils may be reduced, thereby further reducing fabricating costs.

Also, as a plurality of iron cores are coupled using bolt holes 212c provided on the tooth portions 212a and 212b, a wide width of each tooth portion may be ensured, which may result in reducing a worry about torsion of the tooth portion and thus enhancing reliability of the motor. In addition, the motor may be further reduced in size as compared with forming the bolt holes on the yoke portion.

Hereinafter, another embodiment of a reciprocating motor will be described. That is, in the embodiment according to FIG. 5, the yoke portions are formed on both sides of the tooth portion, and the plurality of magnet coils are wound on the yoke portions, respectively. However, in this embodiment, a yoke portion is formed on only one side of a tooth portion, and one magnetic coil is wound on the one yoke portion.

Figure 10:
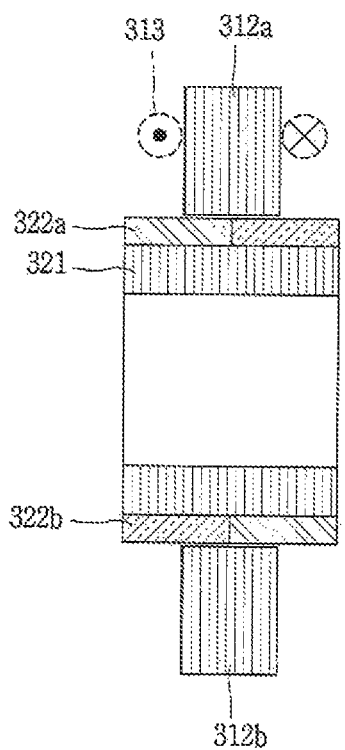
FIG. 10 is a sectional view, taken along line X-X of FIG. 9.

FIG. 9 is a perspective view of a reciprocating motor according to another embodiment. FIG. 10 is a cross-sectional view, taken along line X-X of FIG. 9.

As illustrated in FIGS. 9 and 10, the basic configuration and the thusly-obtained operation effects according to this embodiment are similar to those of the foregoing embodiment described in FIGS. 6 to 8. However, in this embodiment, a yoke portion or yoke 311 is provided with a first horizontal yoke portion or yoke 315a, a first longitudinal yoke portion or yoke 315b, a second horizontal yoke portion or yoke 315b and a second longitudinal yoke portion or yoke 316b, which are all formed on one side surface of each of tooth portions or teeth 312a and 312b.

Accordingly, unlike the embodiment described in FIGS. 6 to 8, the horizontal yoke portions 315a and 316a and the longitudinal yoke portions 315b and 316b are provided one to one. This may result in further reducing the size of the motor as compared with the embodiment of FIGS. 6 to 8.

More particularly, in this embodiment, widths of the tooth portions 312a and 312b are narrowed and widths of the first horizontal yoke portion 315a and the second horizontal yoke portion 316a that extend from the tooth portions 312a and 312b, respectively, are increased. This may allow bolt holes 311a to be formed on each of the horizontal yoke portions 315a, 316a. Accordingly, this embodiment may enhance reliability of the motor as compared with forming the bolt holes on the tooth portions which are relatively sensitive to deformation.

In the drawings, unexplained reference numerals 318a and 318b denote stator pole portions or poles, 321 denotes a mover core, and 322a and 322b denote magnets.

Hereinafter, another embodiment of a reciprocating motor according will be described. That is, in the foregoing embodiments, the mover is provided with the mover core and the plurality of magnets arranged on the mover core in the circumferential direction, but this embodiment further includes a core pole portion made of a magnetic body between the plurality of magnets.

Figure 11:
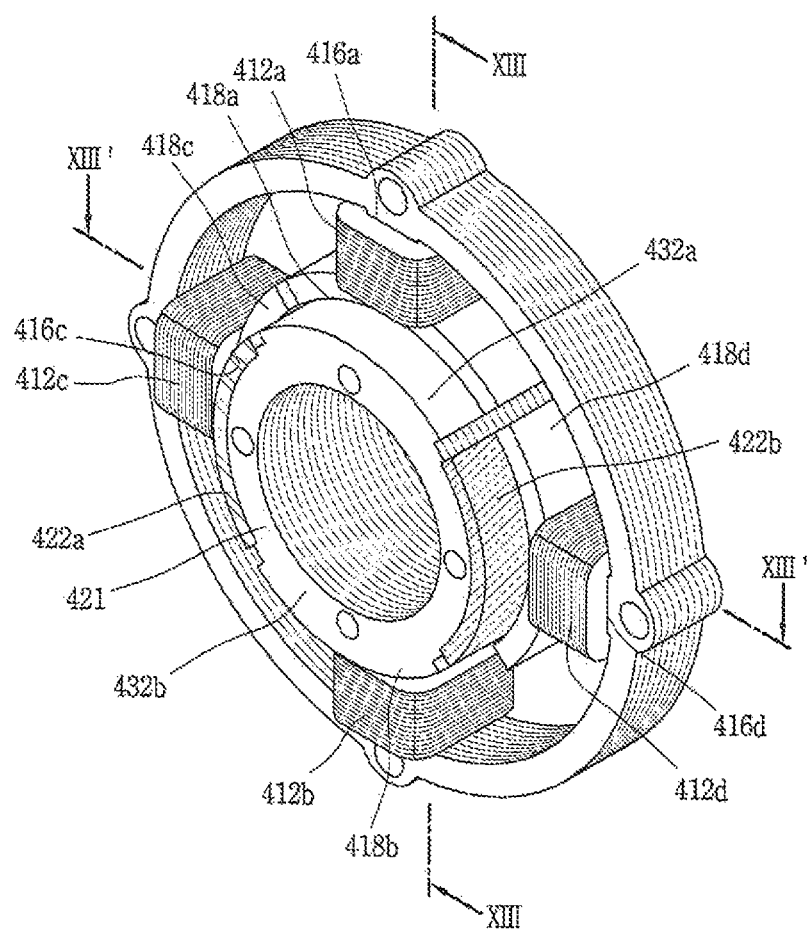
FIG. 11 is a perspective view of a transverse flux reciprocating motor in accordance with another embodiment.
Figure 12:
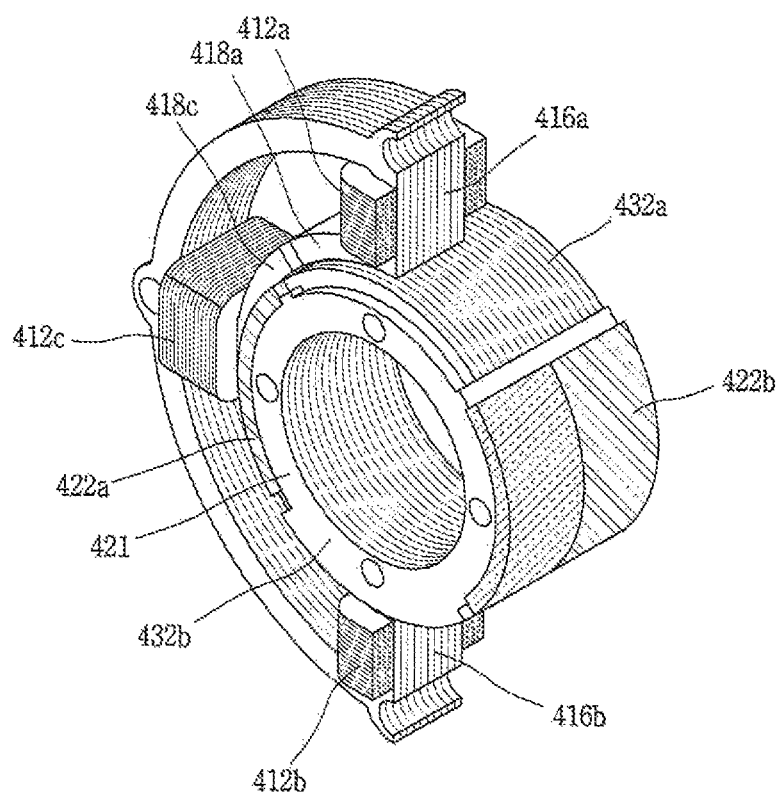
FIG. 12 is a perspective view illustrating a portion of the transverse flux reciprocating motor according to FIG. 11 in a cutoff state.
Figure 13A:
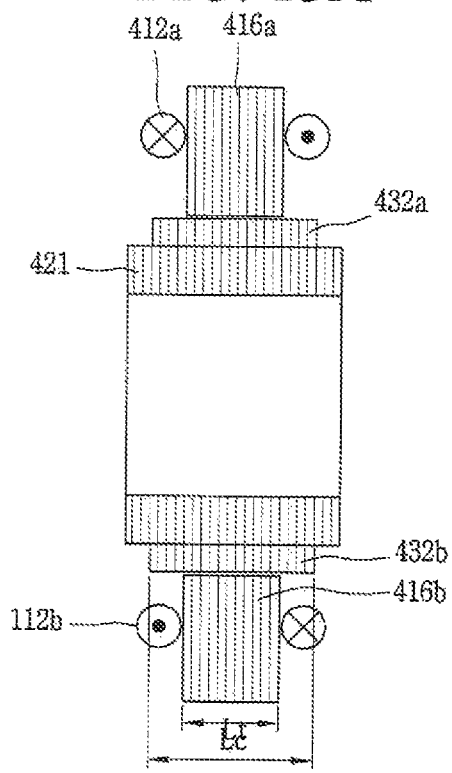
FIGS. 13A and 13B are sectional views, taken along the lines XIII-XIII and XIII'-XIII' in FIG. 11.
Figure 13B:
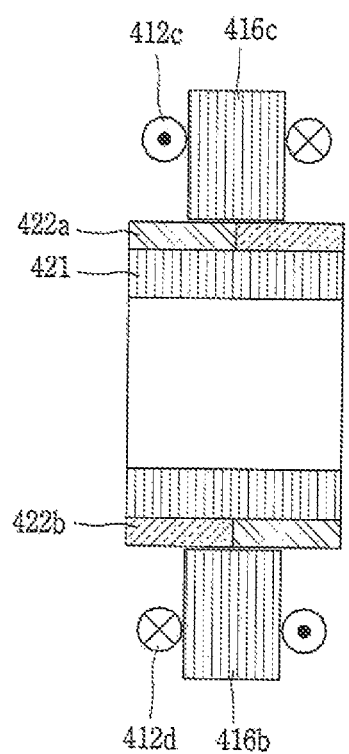

FIG. 11 is a perspective view of a transverse flux reciprocating motor according to another embodiment. FIG. 12 is a perspective view illustrating a portion of the reciprocating motor according to FIG. 11. FIGS. 13A and 13B are cross-sectional views, taken along lines XIII-XIII and XIII'-XIII' of FIG. 11.

As illustrated in FIGS. 11 to 13, magnets 422a and 422b and core pole portions or poles 432a and 432b may be arranged alternately along a circumferential direction. For example, when four tooth portions 416a to 416d are provided, two magnets 422a and 422b and two core pole portions 432a and 432b are arranged, in an alternating manner.

The magnets 422a and 422b may be attached to an outer circumferential surface of a mover core 421, and the core pole portions 432a and 432b may extend from the mover core 421 in a radial direction. However, the core pole portions 432a and 432b may be fabricated as separate magnetic bodies, in some cases, and assembled to the outer circumferential surface of the mover core.

The magnets 422a and 422b, as illustrated in FIG. 11, may be configured as a two-pole magnet having one N pole and one S pole, and the two magnetic poles may be arranged in an axial direction. The magnets 422a and 422b may be arranged to have a same magnetic pole along the circumferential direction and the core pole portions 432a and 432b may be magnetized into a different pole from the magnetic pole of each magnet along the circumferential direction by magnet coils 412a to 412d, so as to form magnetic paths.

An arcuate length of each core pole portion 432a and 432b may be equal to or at least not larger than an arcuate length of each magnet 422a and 422b. This may minimize a reduction of a thrust constant while reducing an amount of magnets used.

A length of each core pole portion 432a and 432b in a reciprocating direction may be smaller than or equal to a length of each magnet in the reciprocating direction. For example, when the length of the core pole portion in the reciprocating direction is Lc and a length of the tooth portion in the reciprocating direction is Lt, the core pole portion may be formed to satisfy (0.5×Lt)<Lc<(2.5×Lt).

Each of the core pole portions 432a and 432b may have a same thickness as a thickness of each of the magnets 422a and 422b. Accordingly, an air gap at an arranged portion of the magnet may be the same as an air gap at a portion without the magnet.

This may prevent lowering of magnetic force between the stator pole portion of the stator and the core pole portion of the mover, in a manner of reducing an amount of magnets used and preventing an increase in the air gap at the portion without the magnet.

Meanwhile, the foregoing embodiment has illustrated that the core pole portion extending from or attached to the mover core is provided between the magnets. However, the core pole portion may be formed by extending the tooth portion of the stator in some cases.

Figure 14:
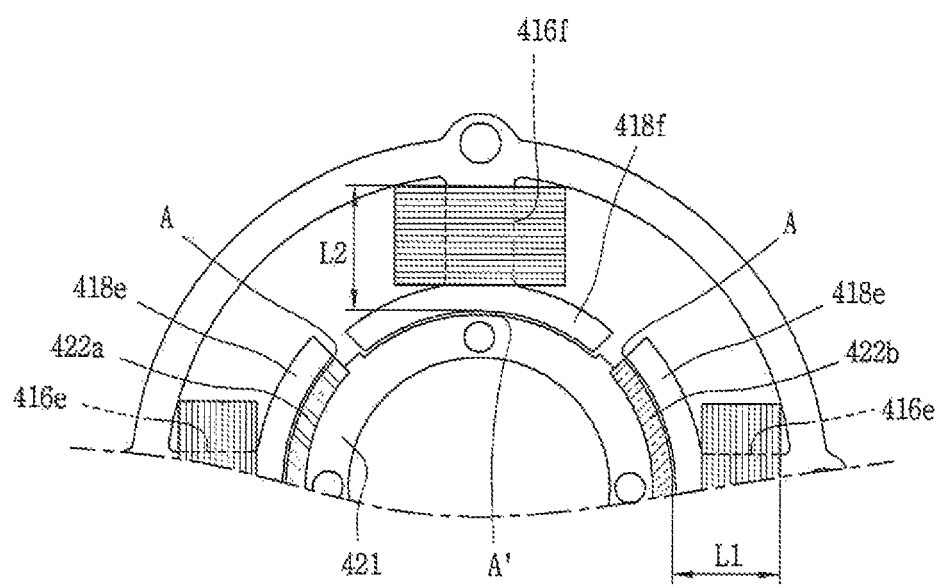
FIG. 14 is a front view of a transverse flux reciprocating motor in accordance with another embodiment.

For example, as illustrated in FIG. 14, a radial length L2 of a tooth portion or tooth 416f (hereinafter, referred to as a "core-side tooth portion" or "core-side tooth") corresponding to a portion without a magnet may be longer than a radial length L1 of a tooth portion or tooth 416e (hereinafter, referred to as a "magnet-side tooth portion" or "magnet-side tooth") corresponding to the magnet 422a, 422b, among those tooth portions extending radially from an inner circumferential surface of the stator core 421, such that an air gap A between an outer circumferential surface of the magnet 422a and an inner circumferential surface of stator pole portion or pole 418e of the magnet-side tooth portion 416e may be the same as an air gap A1 between an outer circumferential surface of the mover core 421 and an inner circumferential surface of the stator pole portion 418f of the core-side tooth portion 416f.

In this case, when a thickness of each of the magnets 422a and 422b is larger than the air gap, the inner circumferential surface of the core-side tooth portion 416f, that is, the stator pole portion 418e may be inserted between both the magnets 422a and 422b. As such, when the stator pole portion 418f of the core-side tooth portion 416f is inserted between the magnets, the stator pole portion 418f of the core-side tooth portion 416f may serve as a type of guide between the magnets during a reciprocating motion of the mover core 421.

Further, another embodiment of a reciprocating motor will be described hereinafter. That is, the foregoing embodiments have illustrated that the stator is provided with one stator core, but this embodiment illustrates that a plurality of stator cores formed in a same shape may be bundled into one stator.

Figure 15:
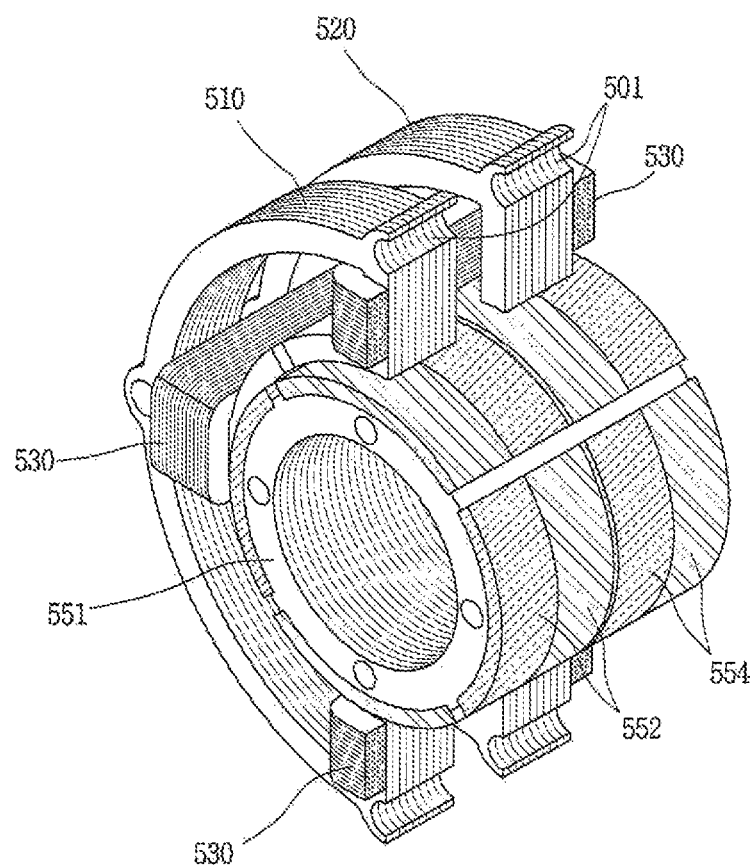
FIG. 15 is a perspective view of a transverse flux reciprocating motor in accordance with another embodiment in a cutoff state.
Figure 16A:
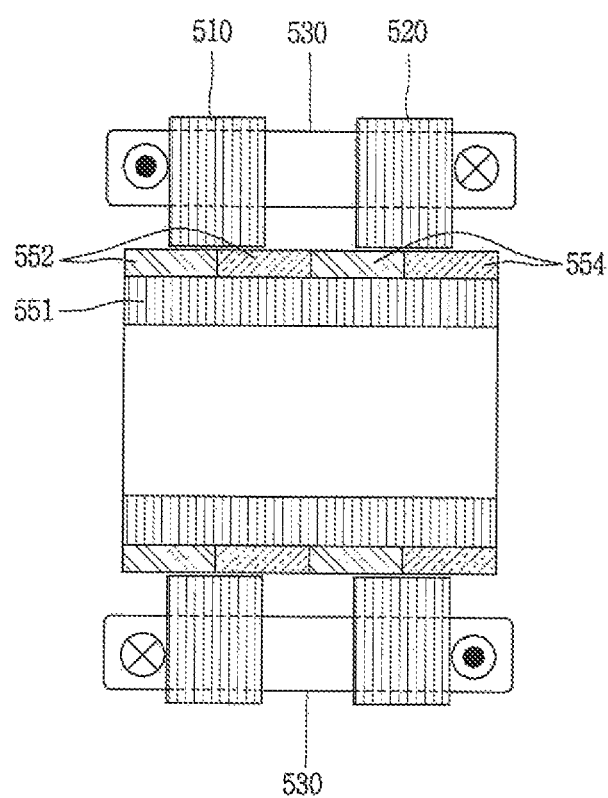
FIG. 16A is a cross-sectional view illustrating a wound state of a magnetic coil in FIG. 15 in accordance with an embodiment.
Figure 16B:
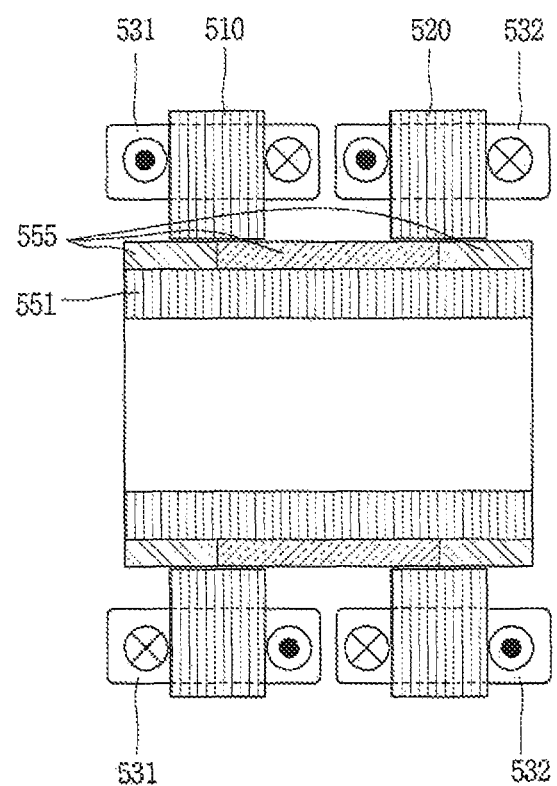
FIG. 16B is a cross-sectional view illustrating the wound state of the magnetic coil in FIG. 15 in accordance with another embodiment.

FIG. 15 is a perspective view of a transverse flux reciprocating motor according to another embodiment. FIG. 16A is a cross-sectional view of a wound state of a magnet coil in FIG. 15 in accordance with an embodiment. FIG. 16B is a cross-sectional view of the wound state of the magnet coil in FIG. 15 in accordance with an embodiment.

As illustrated in FIG. 15, in this embodiment, a first stator core 510 and a second stator core 520 may be arranged in a reciprocating direction of a mover 550. Also, the first stator core 510 and the second stator core 520 may be coupled to each other using connecting members (not illustrated) 501, such as bolts, which may be inserted through bolt holes 501, respectively. Magnet coils 530 may be wound around each tooth portion or tooth 516 of the first stator core 510 and each tooth portion or tooth 526 of the second stator core 520.

The magnet coil 530, as illustrated in FIG. 16A, may be wound collectively on a bundle of the tooth portion 516 of the first stator core 510 and the tooth portion 526 of the second stator core 520, which may be located in a same line in an axial direction and have a same magnetic flux direction. On the other hand, the magnet coil 530 (531, 532), as illustrated in FIG. 16B, may be wound separately on the tooth portion 516 of the first stator core 510 and the tooth portion 526 of the second stator core 520, which may be located in the same line in the axial direction but have opposite magnetic flux directions to each other.

A first magnet 552 forming a mover may be disposed or provided inside of the first stator core 510 with a predetermined gap and a second magnet 554 forming the mover together with the first magnet 552 may be disposed or provided inside of the second stator core 520 with a predetermined gap.

The first magnet 552 and the second magnet 554 may be continuously arranged on an outer circumferential surface of one mover core 551 along a reciprocating direction. Of course, even in this case, the first magnet 552 and the second magnet 554 may be provided on an inner circumferential surface of the mover core 551 when the mover is disposed outside of the stator.

In addition, the first magnet 552 and the second magnet 554 may be formed variously according to a winding manner of the magnet coil 530. For example, as illustrated in FIG. 16A, when the first and second magnets 552 and 554 are collectively wound around the bundle of the first stator core 510 and the second stator core 520, the first magnet 552 and the second magnet 554 each may be configured as a two-pole magnet having an N pole and a S pole, and may be continuously arranged in the reciprocating direction of the mover, such that totally four poles are arranged in the order of N-S-N-S. Of course, in this case, one magnet may also be provided with four poles.

On the other hand, as illustrated in FIG. 16B, when the magnet coil 530 is wound individually around the first stator core 510 and the second stator core 520, a magnet 555 may have three poles according to a winding direction of the magnet coil 530. That is, when a first magnet coil 531 wound on the first stator core 510 and a second magnet coil 532 wound on the second stator core 520 are wound in a same direction, the first stator core 510 and the second stator core 520 may form a same magnetic pole in A same line in an axial direction, and thus, the magnet 555 may be arranged such that the three poles alternately have opposite magnetic poles like S-N-S.

The basic construction and the thusly-obtained operation effects of the reciprocating motor according to this embodiment as described above are similar to those of the foregoing embodiments. However, according to this embodiment, as the plurality of stator cores 510 and 520 are provided, a diameter of the motor may be reduced and a capacity of the motor may be increased.

In particular, when forming the core pole portion as the magnetic body between the magnets, as illustrated in the embodiment of FIG. 11 or 14, an entire amount of the magnets used may be reduced but a thrust constant may be reduced. However, as illustrated in this embodiment, when the plurality of stator cores 510 and 520 are connected in the axial direction and the plurality of magnets 552 and 554 are arranged inside the stator cores 510 and 520 in the reciprocating direction, the reduction of the thrust constant may be prevented even though the amount of the magnets used is not increased as much as the number of stator cores, which may result in improving motor efficiency.

The reciprocating motor according to this embodiment as described above may be applied to a reciprocating compressor.

Figure 17:
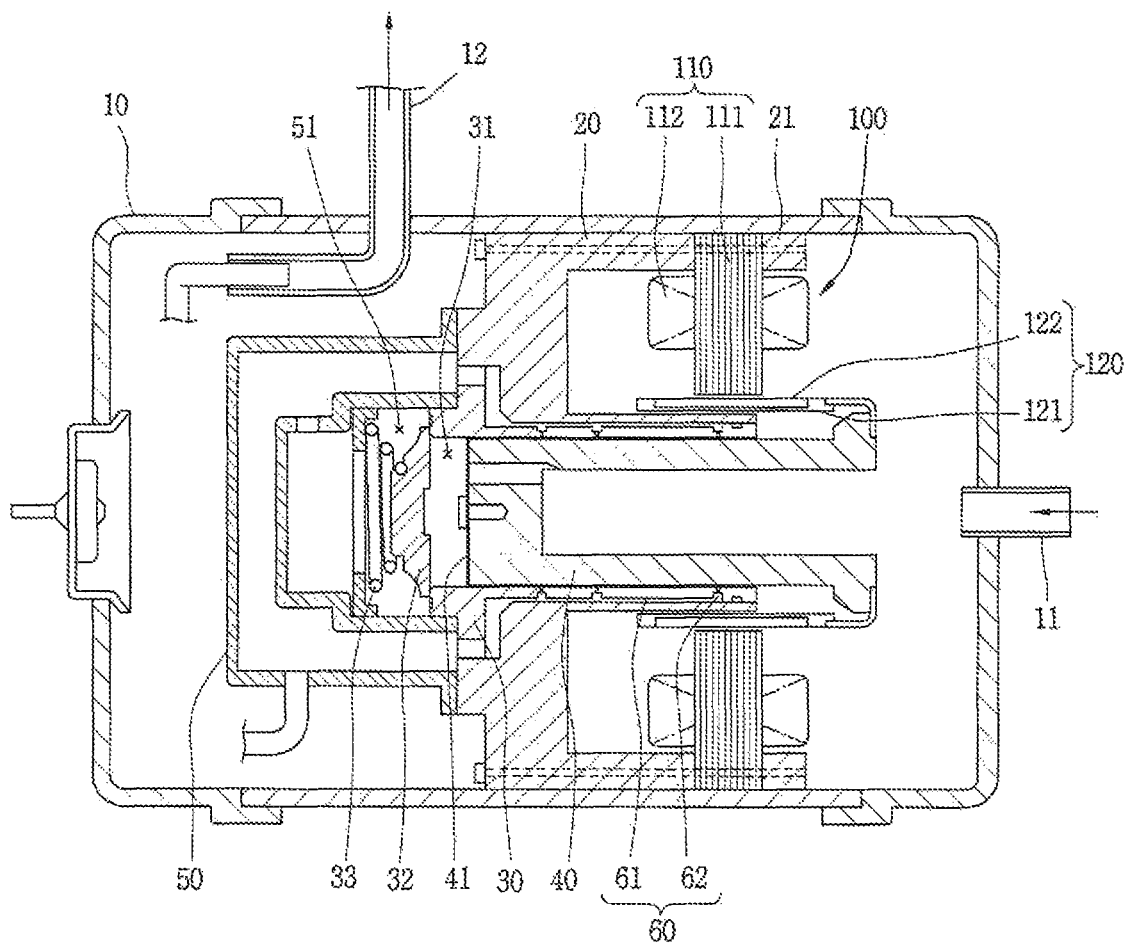
FIG. 17 is a longitudinal cross-sectional view of a reciprocating compressor having a reciprocating motor according to an embodiment.

FIG. 17 is a longitudinal cross-sectional view of a reciprocating compressor to which the reciprocating motor according to an embodiment is applied. As illustrated in FIG. 17, a reciprocating compressor according to this embodiment may include a suction pipe 11 connected to an inner space of a hermetic case 10, and a discharge pipe 12 connected to one side of the suction pipe 11 to guide refrigerant compressed in a compression space 31 of a cylinder 30, which is discussed hereinafter, into a refrigeration cycle. The inner space of the case 10 may form a suction pressure by being filled with introduced refrigerant. The refrigerant discharged from the compression space 31 may be discharged directly out of the case 10 toward a condenser through the discharge pipe 12. A frame 20 may be provided at the inner space of the case 10, and a reciprocating motor 100 that generates a reciprocating force and simultaneously induces a resonance motion of a piston 40, which is discussed hereinafter, may be fixed to one side surface of the frame 20.

The cylinder which has the compression space 31 and is inserted into the frame 20 may be coupled to an inner side of the reciprocating motor 100. A piston 40 that compresses the refrigerant by varying a volume of the compression space 31 may be inserted into the cylinder 30 to reciprocate. A suction valve 42 that opens and closes a suction passage 41 of the piston 40 may be coupled to an end surface of the piston 40, and a discharge valve 32 that opens and closes the compression space 31 of the cylinder 30 may be detachably coupled to an end surface of the cylinder 30 in a manner of being accommodated in a discharge cover 50. The discharge cover 50 provided with a discharge space 51 may be fixedly coupled to the cylinder 30. The discharge valve 32 and a valve spring 33 that support the discharge valve 32 may be accommodated in the discharge space 51 of the discharge cover 50, and an inlet of a gas bearing 60 that provides lubrication between the cylinder 30 and the piston 40 may also be accommodated in the discharge space 51. The gas bearing 60 may be provided with a gas communication path 61 formed between an inner circumferential surface of the frame 20 and an outer circumferential surface of the cylinder 30, and a plurality of fine gas communication holes 61 that penetrates through an inner circumferential surface of the cylinder 30 at a middle portion of the gas communication path 61.

The reciprocating motor 100 may be formed to have a same configuration as those illustrated in FIGS. 1 to 16B. Therefore, this will be understood based on the aforementioned reciprocating motor.

However, the stator 110 in this embodiment may be located between the frame 20 and a back cover 21 and coupled to the frame 20 and the back cover 21 using bolts. The mover 120 may be coupled to the piston 20 by bolts. Therefore, when the mover 120 reciprocates with respect to the stator 110, the piston 40 inserted into the cylinder 30 may reciprocate together with the mover 120.

When an alternating current is applied to magnet coils 112 of the reciprocating motor 100 in the reciprocating compressor according to this embodiment, an alternating magnetic flux may be formed between a tooth portion or tooth (stator pole portion or pole) (no reference numeral given) of the stator 110 and a magnet (mover core) 122 of the mover 120. The magnet 122 placed at an air gap between the stator 110 and the mover 120 may continuously reciprocate along a direction orthogonal to a direction of the magnetic flux formed between the stator 110 and the mover 120.

The piston 40 coupled with the mover 120 may suction and compress a refrigerant while reciprocating in the cylinder 30, and the compressed refrigerant may open the discharge valve 32 to be discharged to the discharge space 51. This series of processes may be repeated.

At this time, in the reciprocating motor 100, as the magnet 122 reciprocates, a magnetic resonance spring is formed between the magnet 122 and the stator 110 and thus induces a resonance motion of the mover 122 and the piston 40. Accordingly, the piston 40 may compress the refrigerant while overcoming a gas force generated in the compression space 31.

The reciprocating compressor according to this embodiment has the operation effects according to the reciprocating motor 100 of FIGS. 1 to 16B described above. Therefore, this will be understood based on the aforementioned reciprocating motor.

Although the reciprocating compressor having the gas bearing has been described in the above embodiment, embodiments may alternatively be applied to a reciprocating compressor having an oil bearing.

Embodiments disclosed herein provide a reciprocating motor capable of reducing fabricating costs by facilitating a fabrication of a stator or a mover. Embodiments disclosed herein further provide a reciprocating motor, capable of simplifying a stacking task by reducing a number of iron cores which form a stator or a mover.

Embodiments disclosed herein provide a reciprocating motor, capable of reducing an overall size of the motor in a manner of miniaturizing iron cores forming a stator or a mover and of easily ensuring a space for maintaining a stacked shape of the iron cores. Embodiments disclosed herein also provide a reciprocating motor, capable of using every frequency within an operating frequency band.

Embodiments disclosed herein additionally provide a reciprocating motor, capable of reducing an overall size of the motor by reducing a length of a resonant spring in a reciprocating direction of the resonant spring. Embodiments disclosed herein provide a reciprocating motor, capable of reducing fabricating costs by simplifying a structure and an assembly process of a resonant spring, such that a mover may execute a resonance motion with respect to a stator.

Also, embodiments disclosed herein provide a reciprocating motor, capable of preventing a mover from being eccentric due to a side force of a resonant spring. Further, embodiments disclosed herein provide a reciprocating motor, capable of enhancing motor efficiency by reducing a number and size of an air gap.

Furthermore, embodiments disclosed herein provide a reciprocating motor, capable of enhancing motor efficiency by reducing power consumption in a manner of reducing a weight of a mover. Finally, embodiments disclosed herein provide a reciprocating compressor, which becomes small in size and light in weight by achieving the aforementioned aspects.

Embodiments disclosed herein provide a transverse flux reciprocating motor in which a direction of flux generated on a stator and a moving direction of a mover are orthogonal to each other. The stator and the mover may be formed by stacking thin iron cores in an axial direction. The stator may include a plurality of tooth portions or teeth along a circumferential direction, and the mover may be arranged in a center of the stator with a predetermined air gap from the tooth portions, and magnets may be arranged within the air gap to have opposite magnetic poles in the axial direction. A magnetic coil may be wound on each of the tooth portions or a yoke portion or yoke connecting the tooth portions, so as to generate the magnetic flux in the circumferential direction.

Embodiments disclosed herein further provide a transverse flux reciprocating motor that may include a stator wound with a magnet coil, and a mover inserted into the stator to perform a reciprocating motion with respect to the stator, the mover coupled with a magnet having opposite magnetic poles in an orthogonal direction with respect to a magnetic flux generated by the magnet coil. One of the stator or the mover may be formed by stacking a plurality of iron cores in a reciprocating direction of the mover.

The stator may include a yoke portion or yoke forming a magnetic path, and a tooth portion or teeth extending from the yoke portion in a radial direction to surround the mover, and the magnet coil may be wound on the tooth portion. The tooth portion may be provided in an even number, and the even number of tooth portions may be arranged along a circumferential direction of the stator with a predetermined interval therebetween. The magnet coil coupled to each tooth portion may form a magnetic flux in an opposite direction to another magnet coil neighboring thereto. The magnet may be provided as the same number as the magnet coil, and the magnet may be arranged to have an opposite magnetic pole to that of the another magnet neighboring thereto.

The stator may include a yoke portion or yoke forming a magnetic path, and first and second tooth portions or teeth extending from the yoke portion in a radial direction to surround the mover. The magnet coil may be wound on the yoke portion.

The yoke portion may be formed in an annular shape by including a first yoke portion or yoke extending from the first tooth portion, and a second yoke portion or yoke extending from the second tooth portion. The magnet coil may be coupled to each of the first and second yoke portions. The magnet coil may be formed in an annular shape with both sides open, and each of the first and second yoke portions may be coupled to the both side openings of the corresponding magnet coil in an inserting manner.

The stator may include a stator core formed by stacking a plurality of iron cores each having a yoke portion or yoke and a tooth portion or teeth. Each tooth portion may be provided with coupling holes such that the plurality of iron cores may be coupled by inserting coupling members through the coupling holes. The yoke portion may be formed by extending from one side of each of the first and second tooth portions, and the magnet coil may be coupled to the yoke portion.

The stator may include a stator core formed by stacking a plurality of iron cores each having a yoke portion or yoke and a tooth portion or teeth. The stator may include at least two stator cores arranged in the reciprocating direction of the mover and coupled to each other.

The magnet coil may be wound on a bundle of tooth portions provided on each of the plurality of stator cores in a collective manner, based on a magnetic flux direction. The magnet coil may be wound on tooth portions provided on each of the plurality of stator cores in an individual manner.

The mover may include a mover core formed by stacking a plurality of iron cores, and a plurality of magnets coupled to the mover core along a circumferential direction of the mover core. The plurality of magnets may be alternately arranged to have opposite magnetic poles along the circumferential direction.

A magnetic body may be provided at a side surface of the magnet along the circumferential direction, and each of the magnet and the magnetic body may correspond to the magnet coils one to one. The magnetic body may extend from the mover core constituting the mover in a radial direction.

The magnetic body may be formed in a manner that the tooth portion extending from an inner circumferential surface of the stator may be inserted between the adjacent magnets. The magnetic body may be attached on an outer circumferential surface of the mover core constituting the mover.

The magnet coil corresponding to the magnet and the magnet coil corresponding to the magnetic body may be wound to form magnetic fluxes in opposite directions to each other. The magnets may be arranged to have the same magnetic pole along the circumferential direction.

The magnetic body may have a length in a reciprocating direction thereof which is shorter than or equal to a length of the magnet in a reciprocating direction of the magnet. The magnetic body may satisfy $(0.5 \times Lt) < Lc < (2.5 \times Lt)$ when a length of the magnetic body in the reciprocating direction is Lc and a length of the tooth portion in the reciprocating direction is Lt.

Embodiments disclosed herein provide a transverse flux reciprocating motor that may include a stator core formed by stacking in an axial direction a plurality of iron cores each provided with a yoke portion or yoke forming a magnetic path, a plurality of tooth portions or teeth radially extending from a circumferential surface of the yoke portion, and at least one slot portion or slot forming a predetermined space between the tooth portions, a plurality of magnet coils wound on the stator core to generate a magnetic flux in a circumferential direction, a mover core formed by stacking a plurality of iron cores in an axial direction, and arranged with an air gap from the tooth portions, and a plurality of magnets located within the air gap to correspond to the tooth portions, and coupled to the mover core such that opposite magnetic poles are arranged along the axial direction.

The magnet coil may be wound to have an opposite magnetic flux direction to another magnet coil neighboring thereto in the circumferential direction. The magnet may be arranged to have an opposite magnetic pole to another magnet neighboring thereto in the circumferential direction.

Embodiments disclosed herein also provide a reciprocating compressor that may include a case having an inner space, a reciprocating motor disposed within the inner space of the case and having a mover that performs a reciprocating motion, a piston coupled to the mover of the reciprocating motor to perform the reciprocating motion together with the mover, a cylinder having the piston inserted therein to form a compression space, a suction valve to open and close an inlet side of the compression space, and a discharge valve to open and close an outlet side of the compression space. The reciprocating motor may be configured as the aforementioned transverse flux reciprocating motor.

Embodiments disclosed herein provide a transverse flux reciprocating motor that may include a stator wound with a plurality of magnet coils, and a mover inserted into the stator to perform a reciprocating motion with respect to the stator, wherein the mover is coupled with a plurality of magnets having opposite magnetic poles in an orthogonal direction with respect to a magnetic flux generated by the plurality of magnet coils. The stator may include a yoke forming a magnetic path, and a plurality of teeth that extend from the yoke in a radial direction to surround the mover, and wherein the plurality of magnet coils is wound on the plurality of teeth.

The plurality of teeth may be provided in an even number. The even number of teeth may be arranged along a circumferential direction of the stator with a predetermined interval therebetween, and the plurality of magnet coils may include a magnet coil coupled to each tooth to form a magnetic flux in an opposite direction to a neighboring magnet coil. A same number of magnets may be provided as the number of magnet coils, and the magnets may be arranged to have an opposite magnetic pole to a magnetic pole of a neighboring magnet.

In a transverse flux reciprocating motor according to embodiments, a stator may be easily fabricated by stacking iron cores constituting a stator core in an axial direction. Accordingly, a number of the iron cores may be reduced and a stacking task may be simplified, thereby reducing fabricating costs.

A space for stacking and fixing the iron cores constituting the stator may be ensured, which may reduce a size of the stator, thereby reducing an entire size and weight of the motor. A mover may be resonated by a magnetic resonance spring, which may prevent in advance a limitation on available operating frequencies within a predetermined operating frequency range, thereby enhancing motor efficiency.

As the mover is resonated by the magnetic resonance spring, a number of components for resonating the mover may be reduced, thereby further shortening a length of the motor in a horizontal direction of the motor. As the mover is resonated by the magnetic resonance spring, the mover may be prevented from being eccentric due to a side force of a resonance spring, thereby reducing frictional loss and noise.

The stator may be installed only on an outer side of a magnet to form a magnetic path together with the magnet. Accordingly, a number and a size of an air gap may be reduced, thereby enhancing motor efficiency.

A magnet frame for supporting the magnet may be excluded or coupled to one end portion or end of the magnet. Accordingly, a weight of the mover may be reduced and thus power consumption may be lowered, thereby enhancing motor efficiency.

By employing the reciprocating motor, a reciprocating compressor which is reduced in size and weight may be provided.

Further scope of applicability of the present application will become more apparent from the detailed description given hereinafter. However, it should be understood that the detailed description and specific examples, while indicating embodiments, are given by way of illustration only, since various changes and modifications within the spirit and scope will become apparent to those skilled in the art from the detailed description.

It should also be understood that the above-described embodiments are not limited by any of the details of the description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transverse flux reciprocating motor, comprising:
   a stator wound with magnet coils; and
   a mover inserted into the stator to perform a reciprocating motion with respect to the stator and formed in an annular shape, wherein the mover is coupled with magnets having opposite magnetic poles in an orthogonal direction with respect to a magnetic flux generated by the magnet coils, wherein the magnets are provided at an outer circumferential surface of the mover at predetermined intervals along a circumferential direction, wherein protrusions extend from the outer circumferential surface of the mover, wherein the protrusions are placed at both sides of the magnets, wherein the stator comprises:
   a magnet-side tooth portion and a core-side tooth portion that extend radially from an inner circumferential surface of the stator;
   a core-side stator pole portion formed at the end of the core-side tooth and facing the outer circumferential surface of the mover; and
   a magnet-side stator pole portion formed at the end of the magnet-side tooth and facing an outer circumferential surface of the magnets, wherein the core-side stator pole portion is inserted between the protrusions such that the protrusions and the core-side stator pole portion partially overlap along the circumferential direction of the mover, wherein a length of the core-side tooth portion is longer than a length of the magnet-side tooth portion, and wherein an air gap between the outer circumferential surface of the magnet and an inner circumferential surface of the magnet-side stator pole portion is the same as an air gap between the outer circumferential surface of the mover and an inner circumferential surface of the core-side stator pole portion.

2. The transverse flux reciprocating motor of claim 1, wherein the magnet coils are wound on the magnet-side tooth portion and the core-side tooth portion, wherein the magnet coil wound on the magnet-side tooth portion and the magnet coil wound on the core-side tooth portion form magnetic fluxes in opposite directions to each other, and wherein the magnets are arranged to have a same magnetic pole along the circumferential direction.

3. A reciprocating compressor, comprising:
a case having an inner space;
a reciprocating motor provided within the inner space of the case and having a mover that performs a reciprocating motion;
a piston coupled to the mover of the reciprocating motor to perform the reciprocating motion together with the mover;
a cylinder having the piston inserted therein to form a compression space;
a suction valve to open and close an inlet side of the compression space; and
a discharge valve to open and close an outlet side of the compression space, wherein the reciprocating motor is the transverse flux reciprocating motor of claim 1.

\* \* \* \* \*